United States Patent [19]

Spangler

[11] Patent Number: 5,221,102
[45] Date of Patent: Jun. 22, 1993

[54] BICYCLE FRAME

[76] Inventor: David V. Spangler, 24606 Santa Clara Ave. #20, Dana Point, Calif. 92629

[21] Appl. No.: 796,853

[22] Filed: Nov. 25, 1991

[51] Int. Cl.$^5$ .............................................. B62K 19/02
[52] U.S. Cl. ................................. 280/281.1; 29/417
[58] Field of Search ............... 280/281.1, 288.2, 288.3; 29/417

[56] References Cited

U.S. PATENT DOCUMENTS

| 544,021 | 8/1895 | Bellis | 280/281.1 |
| 908,127 | 12/1908 | Passmore | 280/281.1 |
| 4,437,679 | 3/1984 | Campagnolo | 280/281.1 |

FOREIGN PATENT DOCUMENTS

| 899761 | 12/1953 | Fed. Rep. of Germany | 280/281.1 |
| 2550154 | 2/1985 | France | 280/281.1 |
| 318386 | 9/1929 | United Kingdom | 280/281.1 |

Primary Examiner—Mitchell J. Hill
Attorney, Agent, or Firm—Jack C. Munro

[57] ABSTRACT

A bicycle frame which includes a plurality of structurally supporting tubes which are constructed in an aerodynamic shape resembling a teardrop. Each of the aerodynamic tubes have a major axis which is approximately three and one half times greater than the length of the minor axis. Each of the aerodynamic tubes are extruded incorporating an x-shaped cross brace the entire length of the tube within the internal chamber of the tube. The aerodynamic tube is to be constructed of aluminum.

5 Claims, 1 Drawing Sheet

BICYCLE FRAME

BACKGROUND OF THE INVENTION

1) Field of the Invention

The field of this invention relates to bicycle frames and more particularly to a bicycle frame which is designed to be of high strength and yet aerodynamically slippery to achieve high performance.

Conventional bicycle frames are built from individual tubes which are secured together by welding, brazing or using other means for joining the tubes. The individual frame tubes are designated by their location in relation to the major components making up the functioning bicycle. The short frame tube which supports the handle bar assembly and the front fork was referred to as the head tube. The tube which supports the seat and connects to the pedal axle support was referred to as the seat tube. The tube which joins the seat tube and the head tube is referred to as the top tube. The tube which descends from the head tube to the pedal hub is called the down tube. The pair of tubes which descend from the seat tube to the rear wheel axle have been referred to as the rear wheel support tubes, one vertical and one horizontal.

Because of the multiplicity of connections required to secure separate tubes in connection with the bicycle frame, it is important to ensure that the welding or other similar type of securement was accomplished most proficiently. Also, it is necessary to construct the bicycle frame of extremely strong tubing and therefore in the past it has been common to utilize round steel tubing.

Within the past several years, bicycle racing has become a common activity for a great number of people. Bicycle racers are always looking for an improvement in the construction of the bicycle which would give that racer an edge over the competition. One particular edge would be if the bicycle frame could be constructed to be a lighter weight but yet maintaining its high strength characteristics. To achieve this end result, bicycle frames have been constructed out of exotic materials such as titanium. However, the use of exotic materials is expensive and not everybody can afford such materials.

One type of material of construction that is light in weight would be aluminum. However, in the past, aluminum has not provided sufficient strength to be used effectively in conjunction with a bicycle frame. The main problem with aluminum is that the bicycle frame incurs wobble or vibration during usage which induces a rough ride which would be poor ride when used in conjunction with a racing bicycle.

Another way in which an edge can be had in conjunction with a racing bicycle is by designing of the tubular members of the frame to be aerodynamic so as to make them slippery as they move through the wind. It has been known in the past to construct bicycle frame members having a general teardrop configuration. The length of the tube in the direction of movement through the air is substantially longer than its width. For structural strength reasons about the best length to width ratio that could be obtained was two to two and a half to one. It has been known that a far better ratio would be around three and one half to one. However, prior to the present invention it has not been possible to design a bicycle frame of sufficient strength that would have the ratio of around three and a half to one.

SUMMARY OF THE INVENTION

The structure of the present invention relates to a bicycle frame wherein the different tubes of the bicycle frame that are facing the wind are constructed of a aerodynamic shape. The entire tubular frame members of the bicycle frame are constructed of aluminum. The major axis versus minor axis of the aerodynamic tubes is around three and one half to one. The tube is extruded with an x-shaped cross brace along the entire length of the tube within the internal chamber of the tube.

The primary objective of the present invention is to construct a strong lightweight bicycle frame which is aerodynamic and is more slippery in moving through the air than previous types of bicycle frames.

Another objective of the present invention is to construct a bicycle frame which is manufacturable easily and adaptable to mass production techniques.

Another objective of the present invention is to construct a one piece bicycle frame constructed of a plurality of interconnected tubes which can utilize a lightweight inexpensive material construction such as aluminum.

DETAILED DESCRIPTION OF THE SHOWN EMBODIMENT

Figure 2:
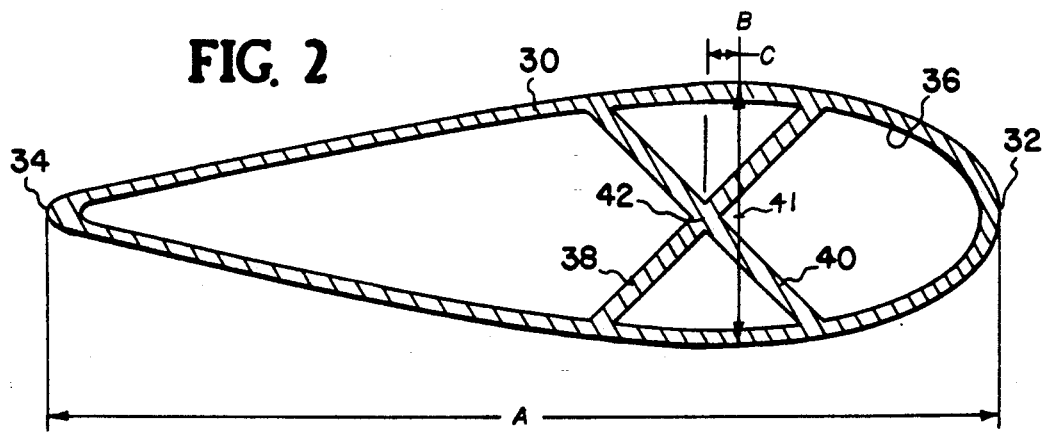
FIG. 2 is a cross-sectional view of either the down tube, the seat tube or the vertical rear wheel support tube incorporated within the frame of FIG. 1 taken along line 2—2 of FIG. 1.
Figure 1:
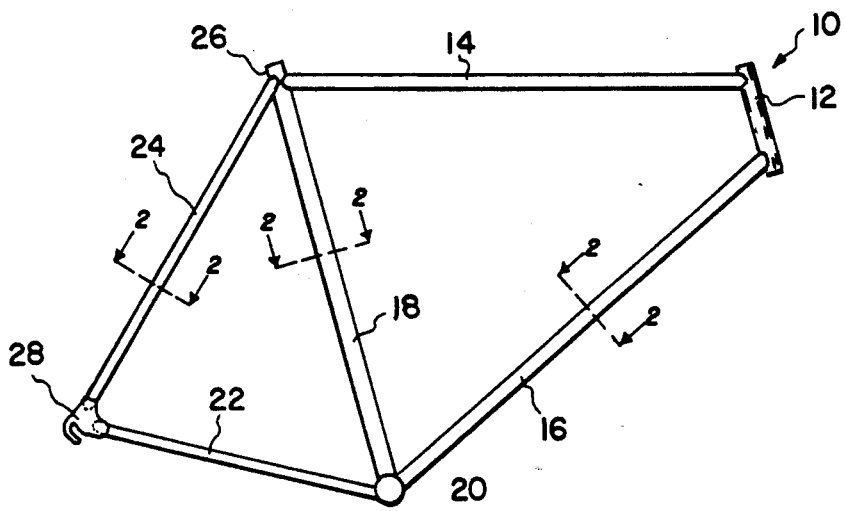
FIG. 1 is a side elevational view of a typical bicycle frame with this bicycle frame being incorporated using the aerodynamic tubular tubes of the present invention.
Figure 3:
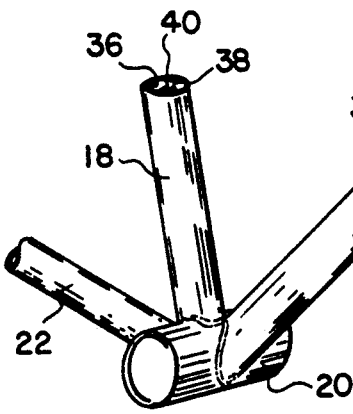
FIG. 3 is an isometric view of the pedal hub showing the tubes being connected thereto.
Figure 4:
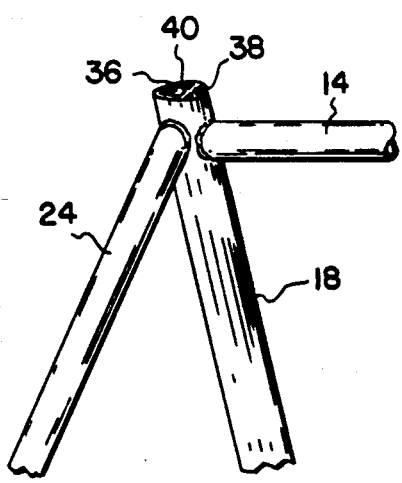
FIG. 4 is a isometric view of the seat post area of the bicycle frame of the present invention.

Referring particularly to the drawing there is shown a bicycle frame 10 which is constructed conventionally and includes a head tube 12 to which is fixedly secured and extends from a top tube 14 and a down tube 16. Connecting the free ends of the top tube 14 and down tube 16 is a seat tube 18. Tubes 16 and 18 are secured together on a hub defined as a housing 20 for a pedal shaft. Extending from the housing 20 is a substantially horizontal rear wheel support tube 22. A vertical rear wheel support tube 24 extends from the seat post area 26. Vertical support tube 24 and horizontal support tube 22 are connected together by a rear wheel mounting bracket 28.

Normally, the down tube 14, the head tube 12 and the horizontal support tube 22 will be constructed of circular cross section. However, the tubes of the frame that traverse the wind in the operation of the bicycle are to be constructed aerodynamic. Therefore, the down tube 16, seat tube 18 and the vertical support tube 24 are to be constructed in an aerodynamic shape. This aerodynamic shape is shown generally within FIG. 2 in cross section.

Each of the tubes 16, 18 and 24 have an exterior wall 30. This wall 30 can be termed aerodynamic and generally resembling a teardrop configuration. Each exterior wall 30 is to be extruded and the preferable material of construction is aluminum. However, it is considered to be within the scope of this invention that other materials could be utilized. The desired thickness of the wall 30 would normally be as thin as possible but yet achieving the desired structural integrity.

The wall 30 has a leading edge 32 and a trailing edge 34. The central axis between the leading edge 32 and the trailing edge 34 is deemed the major axis and it is defined as having a length A. The minor axis, which is perpendicular to the major axis A, and intersects such at an intersection point 41 defines the maximum width of the housing 30 and is defined as B. The preferable ratio between A to B is three and one half to one. However, any ratio exceeding three to one is desirable. The position of the aerodynamic tube of FIG. 2 as tubes 16, 18 and 24 is to be such that the leading edge 32 is to face directly into the path of movement of the bicycle frame.

In order to achieve the desired structural integrity and to prevent twisting of the tube shown by housing 30 in FIG. 2, it is necessary to include a bracing arrangement within the internal chamber 36 of the housing 30. The preferable type of bracing arrangement has been found to be an x-shape composed of cross members 38 and 40. The apex 42 defines the cross point of the cross members 38 and 40 is located a short distance C aft (toward the trailing edge 34) of the minor axis B and intersection point 41. This particular arrangement is found to be desirable to achieve the maximum structural strength of the aerodynamic tube shown in FIG. 2. It is to be understood that the cross members 38 and 40 are to extend the entire length of the aerodynamic tube and also the cross members 38 and 40 are to be extruded and be integral with the housing wall 30. Also, the thickness of the cross members 38 and 40 is deemed to be a matter of choice and is to be selected so as to provide the maximum strength and rigidity to the bicycle frame 10.

What is claimed is:

1. In combination with a bicycle frame, said bicycle frame being composed of a top tube and a down tube connected by a head tube at the leading end and connected by a seat tube at the trailing end, said bicycle frame also including a vertical support tube and a horizontal support tube adapted to support the rear wheel of the bicycle, the improvement comprising:

said down tube and said seat tube and said vertical support tube being constructed of an integral one-piece metallic aerodynamic tube, said aerodynamic tube having a leading edge and a trailing edge, the portion of said aerodynamic tube located nearest said leading edge being substantially more bulbous in shape than the portion of said aerodynamic tube located nearest said trailing edge, said leading edge of each said tube facing directly the direction of movement of said bicycle frame when it is used as a bicycle, said aerodynamic tube having a substantially hollow internal chamber, an x-shaped cross brace located within said internal chamber, said x-shaped cross brace extending the entire length of each aerodynamic tube, said x-shaped cross brace being integral with said aerodynomic tube; and said aerodynamic tube having a major axis and a minor axis, said minor axis being located of the position of greatest width of said aerodynamic tube, said major axis being located at the position of greatest length of said aerodynamic tube, said major axis being at least three times greater in length than said minor axis, said minor axis being perpendicular to said major axis and intersecting said major axis at an intersection point.

2. The combination as defined in claim 1 wherein:

said x-shaped cross brace having an apex located aft of said intersection point and located between said intersection point and said trailing edge, a portion of said x-shaped cross brace being located forward of said intersection point and between said intersection point and said leading edge.

3. The combination as defined in claim 2 wherein:

said aerodynamic tube being constructed of aluminum.

4. A frame composed of a plurality of interconnected tubular members, said frame to be movable in air in a direction, each said tubular member located substantially transverse to said direction and being constructed in an integral one-piece unit having an aerodynamic configuration, said aerodynamic configuration having a leading edge and a trailing edge, the portion of said tubular member located nearest said leading edge being substantially more bulbous in shape than the portion of said tubular member located nearest said trailing edge, said leading edge facing directly the direction of movement of said frame into the air, said integral one-piece unit having a substantially hollow internal chamber, a cross brace located within said substantially hollow internal chamber, said cross brace extending the entire length of said integral one-piece unit; and said integral one-piece unit having a major axis and a minor axis, said major axis being located at the position of greatest length of said integral one-piece unit, said minor axis being located at the position of greatest width of said aerodynamic tube, said major axis being at least three times greater in length than said minor axis, said minor axis being perpendicular to said major axis and intersecting said major axis at an intersection point.

5. The frame as defined in claim 4 wherein:

said cross brace being x-shaped, said x-shaped cross brace having an apex located aft of said intersection point and located between said intersection point and said trailing edge, a portion of said cross brace being located forward of said intersection point and between said intersection point and said leading edge.

* * * * *